United States Patent
Xu et al.

(10) Patent No.: US 10,700,947 B2
(45) Date of Patent: Jun. 30, 2020

(54) LIFE CYCLE MANAGEMENT METHOD AND DEVICE FOR NETWORK SERVICE

(71) Applicant: Huawei Technologies Co., Ltd., Shenzhen (CN)

(72) Inventors: Ruiyue Xu, Shanghai (CN); Li Ji, Shanghai (CN); Lan Zou, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 89 days.

(21) Appl. No.: 15/859,821

(22) Filed: Jan. 2, 2018

(65) Prior Publication Data
US 2018/0145889 A1 May 24, 2018

Related U.S. Application Data

(63) Continuation of application No. PCT/CN2015/099911, filed on Dec. 30, 2015.

(51) Int. Cl.
*H04L 12/24* (2006.01)
*G06F 9/455* (2018.01)
(Continued)

(52) U.S. Cl.
CPC ...... *H04L 41/5041* (2013.01); *G06F 9/45558* (2013.01); *G06F 9/4856* (2013.01);
(Continued)

(58) Field of Classification Search
CPC ....... G06F 2009/45575; G06F 9/45558; G06F 9/4856; G06F 9/5077; H04L 12/4641;
(Continued)

(56) References Cited

U.S. PATENT DOCUMENTS

| 2015/0082308 A1* | 3/2015 | Kiess | G06F 9/5072 718/1 |
| 2016/0337172 A1 | 11/2016 | Yu et al. | |

(Continued)

FOREIGN PATENT DOCUMENTS

| CN | 104115447 A | 10/2014 |
| CN | 104219127 A | 12/2014 |

(Continued)

OTHER PUBLICATIONS

"Network Functions Virtualisation (NFV); Management and Orchestration," Group Specification, European Telecommunications Standards Institute (ETSI), ETSI GS NFV-MAN 001, V1.1.1, Dec. 2014, 184 pages.

(Continued)

*Primary Examiner* — Joe Chacko
(74) *Attorney, Agent, or Firm* — Conley Rose, P.C.

(57) ABSTRACT

A life cycle management method and device for a network service are provided. The method includes determining, by an operation support system (OSS) according to a target network service (NS), an existing virtualized network function (VNF) instance required for life cycle management on the target NS; sending, by the OSS, a life cycle management request of the target NS to a network function virtualization orchestrator (NFVO), where the life cycle management request includes a mapping relationship between an identifier of the existing VNF instance and a characteristic parameter corresponding to the identifier; and receiving, by the NFVO, the life cycle management request from the OSS for the target NS, and performing life cycle management on the target NS according to the existing VNF instance and the mapping relationship. In embodiments of the present disclosure, processing efficiency of life cycle management and resource utilization can be improved.

16 Claims, 8 Drawing Sheets

(51) Int. Cl.
  *G06F 9/48* (2006.01)
  *G06F 9/50* (2006.01)
  *H04L 12/46* (2006.01)

(52) U.S. Cl.
  CPC ........ *G06F 9/5077* (2013.01); *H04L 41/0806* (2013.01); *H04L 41/0896* (2013.01); *H04L 41/5096* (2013.01); *G06F 2009/45575* (2013.01); *H04L 12/4641* (2013.01)

(58) Field of Classification Search
  CPC ............. H04L 41/0806; H04L 41/0896; H04L 41/5041; H04L 41/5096
  See application file for complete search history.

(56) References Cited

U.S. PATENT DOCUMENTS

2017/0034318 A1* 2/2017 Gong ................. H04L 41/0668
2018/0013586 A1 1/2018 Wang

FOREIGN PATENT DOCUMENTS

| | | | |
|---|---|---|---|
| CN | 104253866 | A | 12/2014 |
| CN | 104348873 | A | 2/2015 |
| CN | 104734931 | A | 6/2015 |
| CN | 104954220 | A | 9/2015 |
| EP | 2849064 | A1 | 3/2015 |
| EP | 3133794 | A1 | 2/2017 |
| WO | 2015113278 | A1 | 8/2015 |
| WO | 2015149600 | A1 | 10/2015 |
| WO | 2015172362 | A1 | 11/2015 |

OTHER PUBLICATIONS

Foreign Communication From a Counterpart Application, Korean Application No. 10-2017-7034801, Korean Office Action dated Nov. 7, 2018, 10 pages.
Foreign Communication From a Counterpart Application, Korean Application No. 10-2017-7034801, English Translation of Korean Office Action dated Nov. 14, 2018, 11 pages.
Machine Translation and Abstract of Chinese Publication No. CN104219127, Dec. 17, 2014, 50 pages.
Machine Translation and Abstract of Chinese Publication No. CN104348873, Feb. 11, 2015, 34 pages.
Machine Translation and Abstract of Chinese Publication No. CN104954220, Sep. 30, 2015, 52 pages.
Gautam, D., et al., "Missed Consistency Clarifications for B.5 and C.5," Huawei Technologies (UK), ETRI, Jul. 22, 2014, 46 pages.
Machine Translation of International Publication No. WO2015149600, Oct. 8, 2015, 39 pages.
Foreign Communication From a Counterpart Application, European Application No. 15911830.6, Extended European Search Report dated Apr. 12, 2018, 9 pages.
Foreign Communication From a Counterpart Application, PCT Application No. PCT/CN2015/099911, English Translation of International Search Report dated Sep. 21, 2016, 2 pages.
Machine Translation and Abstract of Chinese Publication No. CN104253866, Dec. 31, 2014, 37 pages.
Foreign Communication From a Counterpart Application, Chinese Application No. 201580078723.6, Chinese Office Action dated Jul. 3, 2019, 12 pages.

* cited by examiner

Constituent_vnf base element

| Identifier | Type | Cardinality | Description |
|---|---|---|---|
| constituent_vnf_id | Leaf | 1 | ID of this constituent vnf in the NSD |
| vnf_reference | Reference | 1 | Reference to a VNFD declared as vnfd in the Network Service via vnf:id. |
| vnf_flavour_id_reference | Reference | 1 | References a VNF flavour (vnfd:deployment_flavour:id) to be used for this service flavour, see clause 6.2.1.3.1. |
| number_of_instances | Leaf | 1 | Number of VNF instances satisfying this service assurance. For a Gold flavour of the vEPC Network Service that needs to satisfy an assurance of 96K cps, 2 instances of the vMME VNFs will be required. |

FIG. 3

| Constituent VNF ID | VNFD ID | VNF deployment flavor ID |
|---|---|---|
| 1 | 1 | 1 |
| 2 | 1 | 1 |
| 3 | 1 | 2 |
| 4 | 2 | 1 |
| ... | ... | ... |

FIG. 4

VNFFGD base element

| Identifier | Type | Cardinality | Description |
|---|---|---|---|
| id | Leaf | 1 | ID of the VNFFG Descriptor |
| vendor | Leaf | 1 | Specify the vendor generating this VNFFG |
| version | Leaf | 1 | Specify the identifier (e.g. name), version, and description of service this VNFFG is describing |
| connection_point | Reference | 2...N | Reference to Connection Points (nsd/service_deployment_flavour:constituent_vnf id:vnfd/pnfd:connection_point:id) forming the VNFFG including Connection Points attached to PNFs, see clause 6.5.1.3 |
| constituent_vnfs | Reference | 1...N | Reference to a VNFD (nsd:deployment_flavours:constituent_vnf:id) used to instantiate this VNF Forwarding Graph |

FIG. 6

LIFE CYCLE MANAGEMENT METHOD AND DEVICE FOR NETWORK SERVICE

CROSS-REFERENCE TO RELATED APPLICATIONS

This application is a continuation of International Patent Application No. PCT/CN2015/099911, filed on Dec. 30, 2015, which is hereby incorporated by reference in the entity.

TECHNICAL FIELD

The present disclosure relates to the field of network functions virtualization technologies, and in particular, to a life cycle management method and device for a network service.

BACKGROUND

A Network Functions Virtualization (NFV) technology is used to virtualize one computer into multiple virtual logical computers, that is, virtual machines (VM). With the aid of a virtualization technology of information technology (IT), the NFV technology allows many types of network devices to use a same industry standard. For example, service, switching, storage, and the like may be deployed in a data center or on a network node. In the NFV technology, various network functions can be implemented in a manner of software, can run on a server of the industry standard, and can be further migrated, instantiated, redeployed, or the like according to a requirement. In addition, a virtualized network function (VNF) can be generated without a need to install a new device. Multiple VNFs may implement a network service (NS).

A network service descriptor (NSD) is a template used by a manufacturer to deploy a network service. One NSD includes multiple virtualized network function descriptors (VNFD) and multiple deployment flavors. The VNFD is a template used by the manufacturer to deploy a virtualized network function. One VNFD may be used for instantiation to obtain multiple VNFs according to different deployment flavors, or one VNFD may be used for instantiation to obtain multiple VNFs according to a same deployment flavor.

An NS instantiation process is as follows. An operations support system (OSS) requests a network functions virtualization orchestrator (NFVO) to instantiate an NS according to a designated NSD. When receiving the request, the NFVO searches for the designated NSD, analyzes a correspondence between multiple VNFDs and multiple deployment flavors in the NSD, performs instantiation to obtain multiple VNFs, and establishes connections between the multiple VNFs. However, existing instantiation processing efficiency and resource utilization are low.

SUMMARY

Embodiments of the present disclosure provide a life cycle management method and device for a network service, so as to improve processing efficiency of life cycle management and resource utilization.

A first aspect of the embodiments of the present disclosure provides a life cycle management method for a network service, and the method includes receiving, by a first device, a life cycle management request sent by a second device for a target network service NS, where the life cycle management request includes a mapping relationship between an identifier of an existing virtualized network function VNF instance and a characteristic parameter corresponding to the identifier, and the characteristic parameter is an identifier parameter that is in a target network service descriptor NSD and that marks each piece of VNF instance requirement information in multiple pieces of VNF instance requirement information required by the target NSD; and performing, by the first device, life cycle management on the target NS according to the existing VNF instance and the mapping relationship.

In a possible implementation, the life cycle management request further includes an identifier of the target NSD.

In a possible implementation, the identifier of the existing VNF instance and the characteristic parameter corresponding to the identifier are determined by the second device according to instance information of the existing VNF instance and the multiple pieces of VNF instance requirement information required by the target NSD.

In a possible implementation, the characteristic parameter is used to identify VNF instance requirement information that is in the target NSD and that includes a virtualized network function descriptor and a deployment flavor.

In a possible implementation, the characteristic parameter is used to identify VNF instance requirement information that is in the target NSD and that includes a virtualized network function descriptor, a deployment flavor, and an instance parameter, and the instance parameter is used to identify different pieces of VNF instance requirement information that have a same virtualized network function descriptor and a same deployment flavor.

In a possible implementation, the first device matches the characteristic parameter of each piece of VNF instance requirement information in the multiple pieces of VNF instance requirement information required by the target NSD with the mapping relationship included in the life cycle management request, and separately obtains a matched characteristic parameter and a mismatched characteristic parameter; the first device directly obtains an existing VNF instance corresponding to the matched characteristic parameter; and the first device performs instantiation according to VNF instance requirement information corresponding to the mismatched characteristic parameter, so as to make full use of an instantiated VNF instance in a network architecture, reduce repeated instantiation processes of some VNF instance requirement information, and improve instantiation processing efficiency.

A second aspect of the embodiments of the present disclosure provides another life cycle management method for a network service, and the method includes determining, by a second device according to life cycle management requirement information, an existing VNF instance required for life cycle management on a target NS; and sending, by the second device, a life cycle management request of the target NS to a first device, where the life cycle management request is used to instruct the first device to perform life cycle management on the target NS, the life cycle management request includes a mapping relationship between an identifier of the existing VNF instance and a characteristic parameter corresponding to the identifier, and the characteristic parameter is an identifier parameter that is in a target NSD and that marks each piece of VNF instance requirement information in multiple pieces of VNF instance requirement information required by the target NSD.

In a possible implementation, the second device determines, according to the life cycle management requirement information, the target NSD and the existing VNF instance required for life cycle management on the target NS, where the target NSD is a descriptor of the target NS; and the second device determines, according to instantiation information of the existing VNF instance and the multiple pieces of VNF instance requirement information required by the target NSD, the identifier of the existing VNF instance and the characteristic parameter corresponding to the identifier.

In a possible implementation, the life cycle management request further includes an identifier of the target NSD.

In a possible implementation, the characteristic parameter is used to identify VNF instance requirement information that is in the target NSD and that includes a virtualized network function descriptor and a deployment flavor.

In a possible implementation, the characteristic parameter is used to identify VNF instance requirement information that is in the target NSD and that includes a virtualized network function descriptor, a deployment flavor, and an instance parameter, and the instance parameter is used to identify different pieces of VNF instance requirement information that have a same virtualized network function descriptor and a same deployment flavor.

A third aspect of the embodiments of the present disclosure provides still another life cycle management method for a network service, and the method includes receiving, by a first device, a life cycle management request sent by a second device for a target NS, where the life cycle management request includes an identifier of a target NSD, the target NSD includes a target virtualized network function forwarding graph descriptor (VNFFGD), and the target VNFFGD includes a characteristic parameter of each piece of virtualized network function VNF instance requirement information in multiple pieces of VNF instance requirement information required by the target NSD; obtaining, by the first device, the target VNFFGD according to the identifier of the target NSD; and performing, by the first device, life cycle management on the target NS according to the characteristic parameter of each piece of VNF requirement information in the target VNFFGD.

In a possible implementation, the first device performs life cycle management on the target NS according to the characteristic parameter of each piece of VNF requirement information in the target VNFFGD, that is, the first device establishes a network connection according to the characteristic parameter of each piece of VNF instance requirement information in the target VNFFGD, multiple VNF instances that are obtained after the target NS is instantiated; and the first device performs instantiation according to the multiple pieces of VNF instance requirement information required by the target NSD to obtain multiple VNF instances, and then establishes a network connection between the multiple VNF instances according to the characteristic parameter of each piece of VNF requirement information in the target VNFFGD.

In a possible implementation, the characteristic parameter is used to identify VNF instance requirement information that is in the target NSD and that includes a virtualized network function descriptor and a deployment flavor.

In a possible implementation, the characteristic parameter is used to identify VNF instance requirement information that is in the target NSD and that includes a virtualized network function descriptor, a deployment flavor, and an instance parameter, and the instance parameter is used to identify different pieces of VNF instance requirement information that have a same virtualized network function descriptor and a same deployment flavor.

A fourth aspect of the embodiments of the present disclosure provides still another life cycle management method for a network service, and the method includes determining, by a second device according to life cycle management requirement information, an identifier of a target NSD required for life cycle management on a target NS; and sending, by the second device, a life cycle management request of the target NS to a first device, where the life cycle management request is used to instruct the first device to perform life cycle management on the target NS, the life cycle management request includes the identifier of the target NSD, the target NSD includes a target VNFFGD, and the target VNFFGD includes a characteristic parameter of each piece of virtualized network function VNF instance requirement information in multiple pieces of VNF instance requirement information required by the target NSD.

A fifth aspect of the embodiments of the present disclosure provides a first device, including a receiving unit configured to receive a life cycle management request sent by a second device for a target network service NS, where the life cycle management request includes a mapping relationship between an identifier of an existing virtualized network function VNF instance and a characteristic parameter corresponding to the identifier, and the characteristic parameter is an identifier parameter that is in a target network service descriptor NSD and that marks each piece of VNF instance requirement information in multiple pieces of VNF instance requirement information required by the target NSD; and a management unit configured to perform life cycle management on the target NS according to the existing VNF instance and the mapping relationship.

The first device provided in the fifth aspect of the embodiments of the present disclosure is configured to implement the first device according to the first aspect of the embodiments of the present disclosure. For a specific implementation process, refer to descriptions in the first aspect. Details are not described herein again.

A sixth aspect of the embodiments of the present disclosure provides a second device, including a determining unit configured to determine, according to life cycle management requirement information, an existing VNF instance required for life cycle management on a target NS; and a sending unit configured to send a life cycle management request of the target NS to a first device, where the life cycle management request is used to instruct the first device to perform life cycle management on the target NS, the life cycle management request includes a mapping relationship between an identifier of the existing VNF instance and a characteristic parameter corresponding to the identifier, and the characteristic parameter is an identifier parameter that is in a target NSD and that marks each piece of VNF instance requirement information in multiple pieces of VNF instance requirement information required by the target NSD.

The second device provided in the sixth aspect of the embodiments of the present disclosure is configured to implement the second device according to the second aspect of the embodiments of the present disclosure. For a specific implementation process, refer to descriptions in the second aspect. Details are not described herein again.

A seventh aspect of the embodiments of the present disclosure provides another first device, including a receiving unit configured to receive a life cycle management request sent by a second device for a target NS, where the life cycle management request includes an identifier of a target NSD, the target NSD includes a virtualized network function forwarding graph descriptor VNFFGD, and the target VNFFGD includes a characteristic parameter of each piece of virtualized network function VNF instance requirement information in multiple pieces of VNF instance requirement information required by the target NSD; an obtaining unit configured to obtain the target VNFFGD according to the identifier of the target NSD; and a management unit configured to perform life cycle management on the NS according to the characteristic parameter of each piece of VNF requirement information in the target VNFFGD.

The first device provided in the seventh aspect of the embodiments of the present disclosure is configured to implement the first device according to the third aspect of the embodiments of the present disclosure. For a specific implementation process, refer to descriptions in the third aspect. Details are not described herein again.

An eighth aspect of the embodiments of the present disclosure provides another first device, including a determining unit configured to determine, according to life cycle management requirement information, an identifier of a target NSD required for life cycle management on a target NS; and a sending unit configured to send a life cycle management request of the target NS to a first device, where the life cycle management request is used to instruct the first device to perform life cycle management on the target NS, the life cycle management request includes the identifier of the target NSD, the target NSD includes a target VNFFGD, and the target VNFFGD includes a characteristic parameter of each piece of virtualized network function VNF instance requirement information in multiple pieces of VNF instance requirement information required by the target NSD.

The second device provided in the eighth aspect of the embodiments of the present disclosure is configured to implement the second device according to the fourth aspect of the embodiments of the present disclosure. For a specific implementation process, refer to descriptions in the fourth aspect. Details are not described herein again.

A ninth aspect of the embodiments of the present disclosure provides a life cycle management system for a network service, and the life cycle management system includes the first device in the fifth aspect and the second device in the sixth aspect, and/or the first device in the seventh aspect and the second device in the eighth aspect.

In the embodiments of the present disclosure, a second device determines, according to a target NS, an existing VNF instance required for life cycle management on the target NS, and sends a life cycle management request of the target NS to a first device. The life cycle management request is used to instruct the first device to perform life cycle management on the target NS, and the life cycle management request includes a mapping relationship between an identifier of the existing VNF instance and a characteristic parameter corresponding to the identifier. The characteristic parameter is an identifier parameter that is in a target NSD and that marks each piece of VNF instance requirement information in multiple pieces of VNF instance requirement information required by the target NSD. The first device receives the life cycle management request sent by the second device for the target NS, and performs life cycle management on the target NS according to the existing VNF instance and the mapping relationship. In this way, the first device performs life cycle management on the NS according to the existing VNF instance and the mapping relationship in the life cycle management request sent by the second device, and processing efficiency of life cycle management and resource utilization are improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 3 shows a base constituent element of a VNF according to an embodiment of the present disclosure;

FIG. 4 shows a list of a correspondence between a characteristic parameter and another parameter according to an embodiment of the present disclosure;

FIG. 6 shows a base element of a VNFFGD according to an embodiment of the present disclosure;

DESCRIPTION OF EMBODIMENTS

A life cycle management method, device, and system for a network service according to embodiments of the present disclosure can be applied to a scenario in which life cycle management is performed on a NS in a NFV network.

Figure 1:
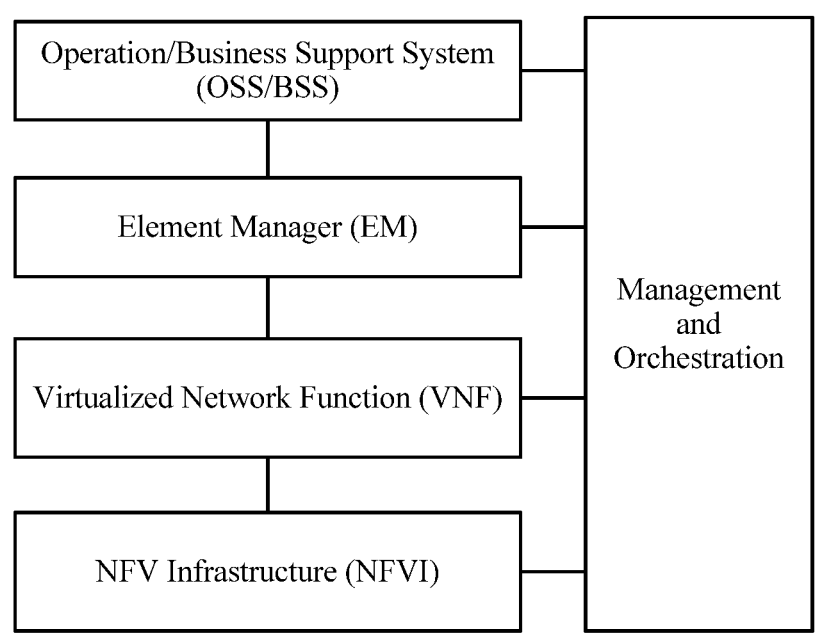
FIG. 1 is a schematic diagram of a network architecture of NFV.

Referring to FIG. 1, FIG. 1 is a schematic diagram of a network architecture of NFV. In a vertical direction, an NFV network is divided into three layers: an infrastructure layer (NFVI), a VNF, and a management layer. The infrastructure layer is a resource pool from a perspective of cloud computing. A physical infrastructure to which the NFVI is mapped is multiple geographically scattered data centers that are connected using a high-speed communications network. The NFVI needs to convert physical computing/storage/switching resources into a virtual computing/storage/switching resource pool by means of virtualization. The virtual network layer includes multiple VNF network elements, which are not shown in FIG. 1. The virtual network layer is corresponding to each current telecommunication network service. Each physical network element is mapped to a virtualized network function VNF network element. Resources required by the VNF need to be decomposed into virtual computing/storage/switching resources, and the resources are carried by the NFVI. For an interface between VNFs, a signaling interface defined in a conventional network is still used. Multiple VNFs can implement one network service NS. The management layer includes an operations support layer (Operation/Business Support System, OSS/BSS) and element management (EM). The EM is used for managing some VNF network elements. The operations support layer is a current OSS/BSS system, and is a system of supporting integration and information resource sharing of telecommunication operators. The OSS/BSS system mainly includes components such as network management, system management, charging, operating, billing, and a customer service. Systems are integrated using a uniform information bus. The OSS/BSS system can help an operator develop an operations support system that matches a characteristic of the operator, and determine a development direction of the system. Furthermore, the OSS/BSS system can help a user develop an integration standard of the system, so as to improve service quality for the user. The BSS is a business support system, the OSS is an operations support system, and the OSS/BSS system makes a necessary modification and adjustment for virtualization in the NFV network architecture. In a horizontal direction, the NFV network is divided into a network service field and a resource management and orchestration field. The network service field refers to various current telecommunication network services, that is, including the OSS/BSS, the EM, the VNF, and the NFVI. The resource management and orchestration (MANO) field is in charge of management and orchestration of all NFVI resources, mapping and association of network services and NFVI resources, implementation of an OSS service resource procedure, and the like. The MANO includes a virtualized infrastructure manager (VIM), a virtualized network function manager (VNFM), and a NFVO, which are not shown in FIG. 1. The NFVO, the VNFM, and the VIM are arranged from top to bottom in a structure of the MANO. The VIM is in charge of management of a virtualized infrastructure, and main functions of the VIM include collecting status information of hardware resources and virtual resources, and reporting the status information to the VNFM, so as to implement resource monitoring and fault detection and reporting; and receiving an upper-layer application request from the VNFM and performing authentication, and after the authentication succeeds, controlling a virtual machine manager to perform the upper-layer application request, so as to implement migration and flexible scalability of resources. The VNFM is in charge of life cycle management of the VNF and monitoring use of VNF resources, which include instantiation, addition, deletion, change, query, scale-out/scale-in, and reservation of the VNF, dynamic monitoring of resources occupied by the VNF, and the like. The NFVO is in charge of management and orchestration of an infrastructure and a virtualized network function VNF, thereby implementing a complete network service.

The OSS/BSS in FIG. 1 may send a life cycle management request to the MANO. The life cycle management request may be used to request the MANO to instantiate a network service NS, may be used to request the MANO to establish a network connection between multiple VNFs obtained after instantiation, or may be used to request the MANO to update a network service NS, or the like. For example, the life cycle management request is used to request the MANO to instantiate an NS. The life cycle management request includes an identifier of a designated NSD. When receiving the life cycle management request, the MANO searches for the designated NSD according to the identifier of the designated NSD, analyzes the designated NSD to determine VNF instance requirement information in the designated NSD, and performs instantiation according to the VNF instance requirement information to obtain multiple VNF instances, thereby implementing instantiation of the NS. However, there are instantiated VNF instances in the network architecture including the OSS/BSS and the MANO, and some instantiated VNF instances in these instantiated VNF instances match some VNF instance requirement information required by the designated NSD, so that the MANO can directly use these instantiated VNF instances to instantiate the NS. However, the MANO still instantiates the NS according to the foregoing procedure. Consequently, instantiation processing efficiency is reduced, and instantiated VNF instance resources in the network architecture are wasted.

To resolve prior-art problems of low instantiation processing efficiency and a waste of resources, the embodiments of the present disclosure provide a life cycle management method for a network service, so as to improve processing efficiency of life cycle management, make full use of VNF instance resources in a network architecture, and improve resource utilization.

The life cycle management method for a network service according to the embodiments of the present disclosure may be applied to the network architecture shown in FIG. 1. A method provided in Embodiment 1 of the present disclosure is a life cycle management method used to instantiate an NS. A method provided in Embodiment 2 of the present disclosure is a life cycle management method used to establish a network connection between instantiated VNF instances. A first device in the embodiments of the present disclosure is a device receiving a life cycle management request, that is, a device on which the MANO in FIG. 1 runs, and the first device includes a virtualized network function manager and a network functions virtualization orchestrator. A second device in the embodiments of the present disclosure is a device initiating a life cycle management request, that is, the device on which the OSS/BSS in FIG. 1 runs.

Figure 2:
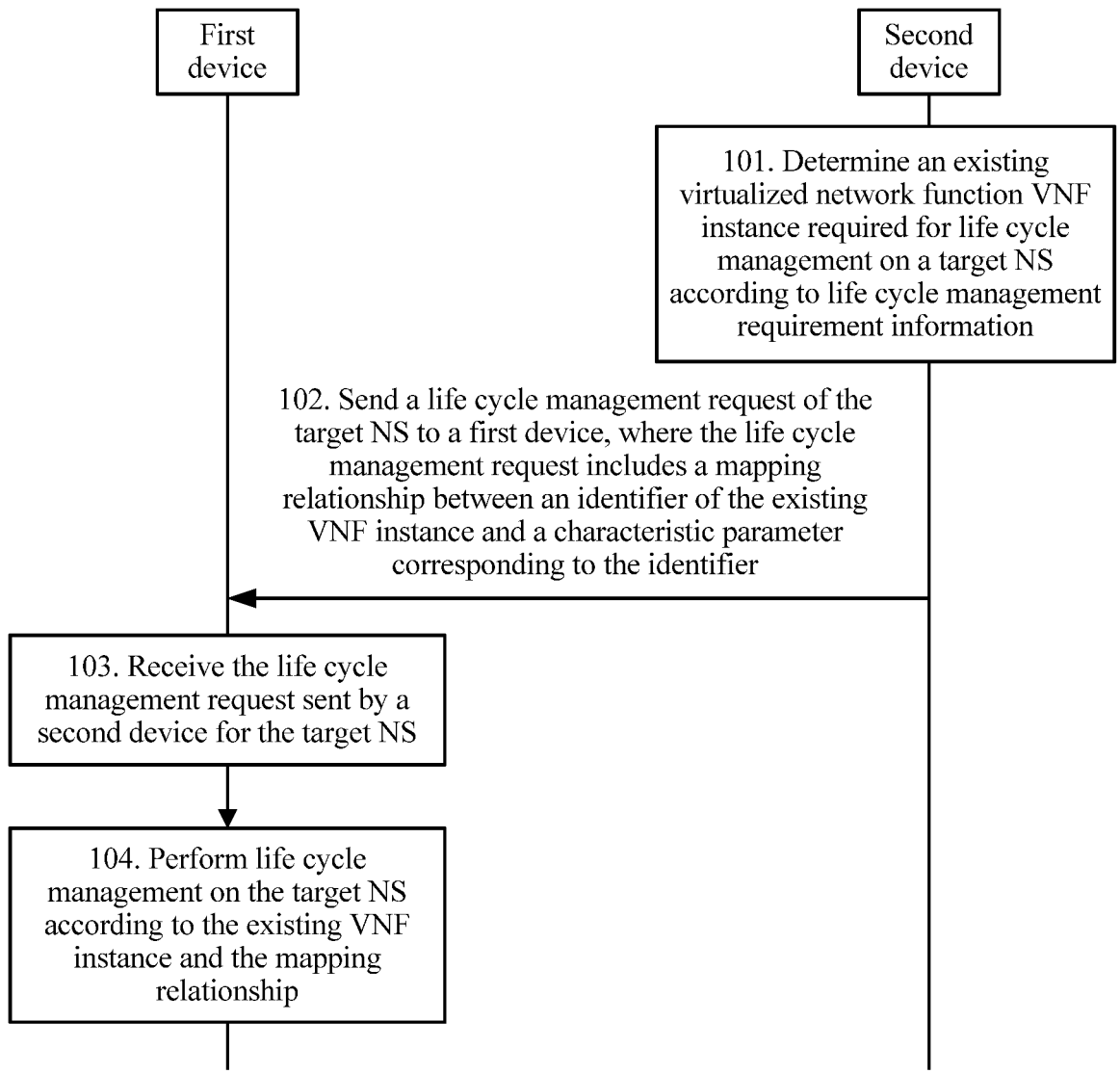
FIG. 2 is a schematic flowchart of a life cycle management method for a network service according to Embodiment 1 of the present disclosure.

With reference to FIG. 2 and FIG. 3, the following describes in detail the life cycle management method for a network service according to the embodiments of the present disclosure.

FIG. 2 is a schematic flowchart of a life cycle management method for a network service according to Embodiment 1 of the present disclosure. As shown in FIG. 2, the method provided in Embodiment 1 of the present disclosure may include the following step 101 to step 104.

101. A second device determines an existing virtualized network function VNF instance required for life cycle management on a target NS according to life cycle management requirement information.

There are some instantiated VNF instances in the network architecture shown in FIG. 1. These instantiated VNF instances may be obtained by requesting a MANO to perform instantiation in advance, may be VNF instances reserved when another NS is released, or may be VNF instances that may be repeatedly used in another instantiated NS in the network architecture. An instantiated VNF instance may be obtained by means of instantiation by the MANO according to instance requirement information of the VNF. Instantiation information of an instantiated VNF instance is requirement information according to which instantiation is performed, and includes a virtualized network function descriptor VNFD. The VNFD is a template used by a manufacturer to deploy a virtualized network function, and the VNFD includes multiple deployment flavors. One VNFD may be used for instantiation to obtain multiple VNF instances according to different deployment flavors, or one VNFD may be used for instantiation to obtain multiple VNF instances according to a same deployment flavor. Both the first device and the second device can obtain, according to these instantiated VNF instances, instantiation information corresponding to the instantiated VNF instances.

The second device is a device initiating a life cycle management request, and the life cycle management request in this embodiment of the present disclosure is used to instantiate an NS. Instantiation is changing a class to a concrete instance. In this embodiment of the present disclosure, instantiating an NS is performing instantiation to obtain a concrete network service instance that has a function, and instantiating a VNF is performing instantiation to obtain a concrete virtualized network function instance that has a function. Multiple virtualized network function instances may be combined to implement one network service instance. Actually, instantiating an NS is instantiating multiple VNFs required for implementation of the NS and connecting multiple VNF instances.

Because there are some instantiated VNF instances in the network architecture shown in FIG. 1, when the second device intends to initiate the life cycle management request, the second device determines, according to the life cycle management requirement information, an existing VNF instance required for life cycle management on the target NS. The target NS is a current to-be-instantiated NS. The existing VNF instance required for life cycle management on the target NS is one or more of the instantiated VNF instances that are already in the network architecture shown in FIG. 1, and the existing VNF instance is used to instantiate the target NS. A specific quantity of existing VNF instances is determined according to a specific situation. The life cycle requirement management information is used to determine the to-be-instantiated NS, that is, the target NS. The life cycle management request is further used to determine a target NSD of the target NS, that is, a network service descriptor of the target NS. The network service descriptor is a template that is used by a manufacturer to deploy a network service. One NSD includes multiple VNFDs, and one VNFD includes multiple deployment flavors. The VNFD and the deployment flavor are used as instance requirement information, and then the NSD includes multiple pieces of VNF instance requirement information.

The second device determines, according to the target NSD, the multiple pieces of VNF instance requirement information required by the target NSD. The second device determines, according to the multiple pieces of VNF instance requirement information required by the target NSD, the existing VNF instance required for life cycle management on the target NS. The second device matches instantiation information corresponding to the instantiated VNF instance in the network architecture with the multiple pieces of VNF instance requirement information required by the target NSD, and if there is matched VNF instantiation information, an instantiated VNF instance corresponding to the matched VNF instantiation information is determined as the existing VNF instance required for life cycle management on the target NS.

In this embodiment of the present disclosure, a characteristic parameter used to identify VNF instance requirement information is added to a constituent VNF IE architecture in a service deployment flavor structure in the target NSD, that is, a constituent VNF ID is added to nsd:service_deployment_flavour:constituent_VNF. Referring to FIG. 3, FIG. 3 shows a base constituent element of a VNF according to this embodiment of the present disclosure. A base constituent element of a VNF in the prior art does not include constituent_vnf_id in a table shown in FIG. 3. The constituent VNF ID is unique in an NSD to which the constituent VNF ID belongs, that is, one constituent VNF ID is used to identify only one piece of VNF instance requirement information. Referring to FIG. 4, FIG. 4 shows a list of a correspondence between a characteristic parameter and other parameters according to this embodiment of the present disclosure. A constituent VNF ID is the characteristic parameter, a VNFD ID is an identifier of a virtualized network function descriptor, and a VNF deployment flavor ID is an identifier of a deployment flavor. The VNFD ID and the VNF deployment flavor ID may represent one piece of VNF instance requirement information. It can be learned that each piece of instance requirement information in multiple pieces of VNF instance requirement information required by the target NSD is corresponding to one characteristic parameter. It should be noted that, FIG. 4 does not exist in actual application, and data in FIG. 4 is only used as an example. FIG. 4 is used to help a reader understand a relationship between a characteristic parameter and other parameters. Characteristic parameters are identifier parameters that are in an NSD and that are used by an NSD provider to mark multiple pieces of VNF instance requirement information required by the NSD, or identifier parameters that are used by the second device to mark multiple pieces of VNF instance requirement information required by the NSD.

Optionally, the characteristic parameter is used to identify VNF instance requirement information that is in the target NSD and that includes a virtualized network function descriptor VNFD and a deployment flavor. That is, as shown in FIG. 4, each of different pieces of VNF instance requirement information is corresponding to one unique characteristic parameter.

Optionally, the characteristic parameter is used to identify VNF instance requirement information that is in the target NSD and that includes a virtualized network function descriptor, a deployment flavor, and an instance parameter. That is, a column of instance identifiers (IDs), that is, instance parameters, is added to FIG. 4. The instance parameter is used to identify different pieces of VNF instance requirement information that have a same virtualized network function descriptor and a same deployment flavor. For example, a VNFD ID and a VNF deployment flavor ID in the second row are respectively the same as a VNFD ID and a VNF deployment flavor ID in the third row, but the two rows represent different pieces of VNF instance requirement information. Therefore, the instance parameter is used to differentiate between the two pieces of VNF instance requirement information. An instance ID in the second row is 1, and an instance ID in the third row is 2.

Based on FIG. 3 and FIG. 4, after the second device determines an existing VNF instance required for life cycle management on the target NS, the second device determines the identifier of the existing VNF instance and the characteristic parameter corresponding to the identifier according to instantiation information of the existing VNF instance and the multiple pieces of VNF instance requirement information required by the target NSD. That is, the second device matches the instantiation information of the existing VNF instance with the multiple pieces of VNF instance requirement information required by the target NSD, so as to determine the identifier of the existing VNF instance and the characteristic parameter corresponding to the identifier. The identifier of the existing VNF instance is obtained by marking the existing VNF instance by the second device, or the identifier of the existing VNF instance is obtained after the first device marks the existing VNF instance and feeds the marked existing VNF instance back to the second device. If there is one existing VNF instance, an identifier of the existing VNF instance and a characteristic parameter corresponding to the identifier are determined. If there are more than one existing VNF instance, an identifier of each existing VNF instance and a characteristic parameter corresponding to the identifier of each existing VNF are determined.

102. The second device sends a life cycle management request of the target NS to a first device, where the life cycle management request includes a mapping relationship between an identifier of the existing VNF instance and a characteristic parameter corresponding to the identifier.

The second device sends the life cycle management request of the target NS to the first device, and the life cycle management request is used to instruct the first device to perform life cycle management on the target NS. The life cycle management request includes the mapping relationship between the identifier of the existing VNF instance and the characteristic parameter corresponding to the identifier. It may be understood that the identifier of the existing VNF instance and the characteristic parameter corresponding to the identifier appear in pairs, that is, an identifier of one existing VNF instance is corresponding to one characteristic parameter, or an identifier of one existing VNF instance is corresponding to one constituent VNF ID. One mapping relationship is a correspondence between an identifier of one existing VNF instance and a constituent VNF ID corresponding to the identifier. For example, if an identifier of an existing VNF instance is 1, and a characteristic parameter "constituent VNF ID" corresponding to the identifier is 1, a mapping relationship may be expressed as "VNF instance ID 1↔constituent VNF ID 1". If there are multiple existing VNF instances, the life cycle management request includes multiple mapping relationships.

The life cycle management request further includes an identifier of the target NSD. The identifier of the target NSD is used by the first device to search for the target NSD according to the identifier of the target NSD, so as to perform life cycle management. In the prior art, the life cycle management request includes only the identifier of the target NSD. Therefore, the first device can instantiate the target NS according to only the identifier of the target NSD, instantiation processing efficiency is reduced, and instantiated VNF instance resources in the network architecture are wasted.

103. The first device receives the life cycle management request sent by the second device for the target NS.

The first device is a device on which the MANO in FIG. 1 runs. The first device includes a virtualized infrastructure manager VIM, a VNFM, and a NFVO. The NFVO receives the life cycle management request sent by the second device for the target NS, and searches for the target NSD according to the identifier of the target NSD. The NFVO stores multiple NSDs and instantiation information of multiple instantiated VNF instances.

104. The first device performs life cycle management on the target NS according to the existing VNF instance and the mapping relationship.

The first device performs life cycle management on the target NS, that is, instantiates the target NS, according to the existing VNF instance and the mapping relationship. The first device obtains, according to the found target NSD, multiple pieces of VNF instance requirement information required by the target NSD. The first device may obtain the multiple pieces of VNF instance requirement information from a memory of the first device, or from the second device, and this is not limited herein. The NFVO in the first device analyzes, in sequence, the multiple pieces of obtained VNF instance requirement information corresponding to the target NSD. For example, if the first piece of VNF instance requirement information is "VNFD ID 1+VNF deployment flavor ID 1", and a corresponding characteristic parameter "constituent VNF ID" is 1, the NFVO detects whether a mapping relationship of a constituent VNF ID 1 is in the life cycle management request. If the mapping relationship does not exist, the NFVO sends an instantiation request to the VNFM. The instantiation request includes "VNFD ID 1+VNF deployment flavor ID 1", and the instantiation request is used to request the VNFM to generate a VNF instance 1 according to "VNFD ID 1+VNF deployment flavor ID 1". The VNFM receives the instantiation request, generates the VNF instance 1 according to "VNFD ID 1+VNF deployment flavor ID 1", and feeds the VNF instance 1 back to the NFVO. If the mapping relationship exists, the NFVO directly obtains an existing VNF instance that has the mapping relationship of the constituent VNF ID 1, without sending an instantiation request to the VNFM. A prerequisite for performing this step is that the existing VNF instance exists on the NFVO side, and if no existing VNF instance exists on the NFVO side, the NFVO still needs to send an instantiation request to the VNFM. By analogy, when the first device completes instantiation of the multiple pieces of VNF instance requirement information required by the target NSD, the first device completes instantiation of the target NS.

Optionally, after the first device completes instantiation of the target NS, the first device feeds multiple VNF instances obtained after instantiation back to the second device, so that the second device determines, before initiating a life cycle management request, an existing VNF instance required by current life cycle management.

In this embodiment of the present disclosure, a second device determines, according to a target NS, an existing VNF instance required for life cycle management on the target NS, and sends a life cycle management request of the target NS to a first device. The life cycle management request is used to instruct the first device to perform life cycle management on the target NS, and the life cycle management request includes a mapping relationship between an identifier of the existing VNF instance and a characteristic parameter corresponding to the identifier. The characteristic parameter is an identifier parameter that is in a target NSD and that marks each piece of VNF instance requirement information in multiple pieces of VNF instance requirement information required by the target NSD. The first device receives the life cycle management request sent by the second device for the target NS, and performs life cycle management on the target NS according to the existing VNF instance and the mapping relationship. In this way, the first device performs life cycle management on the NS according to the existing VNF instance and the mapping relationship in the life cycle management request sent by the second device, and processing efficiency of life cycle management and resource utilization are improved.

Figure 5:
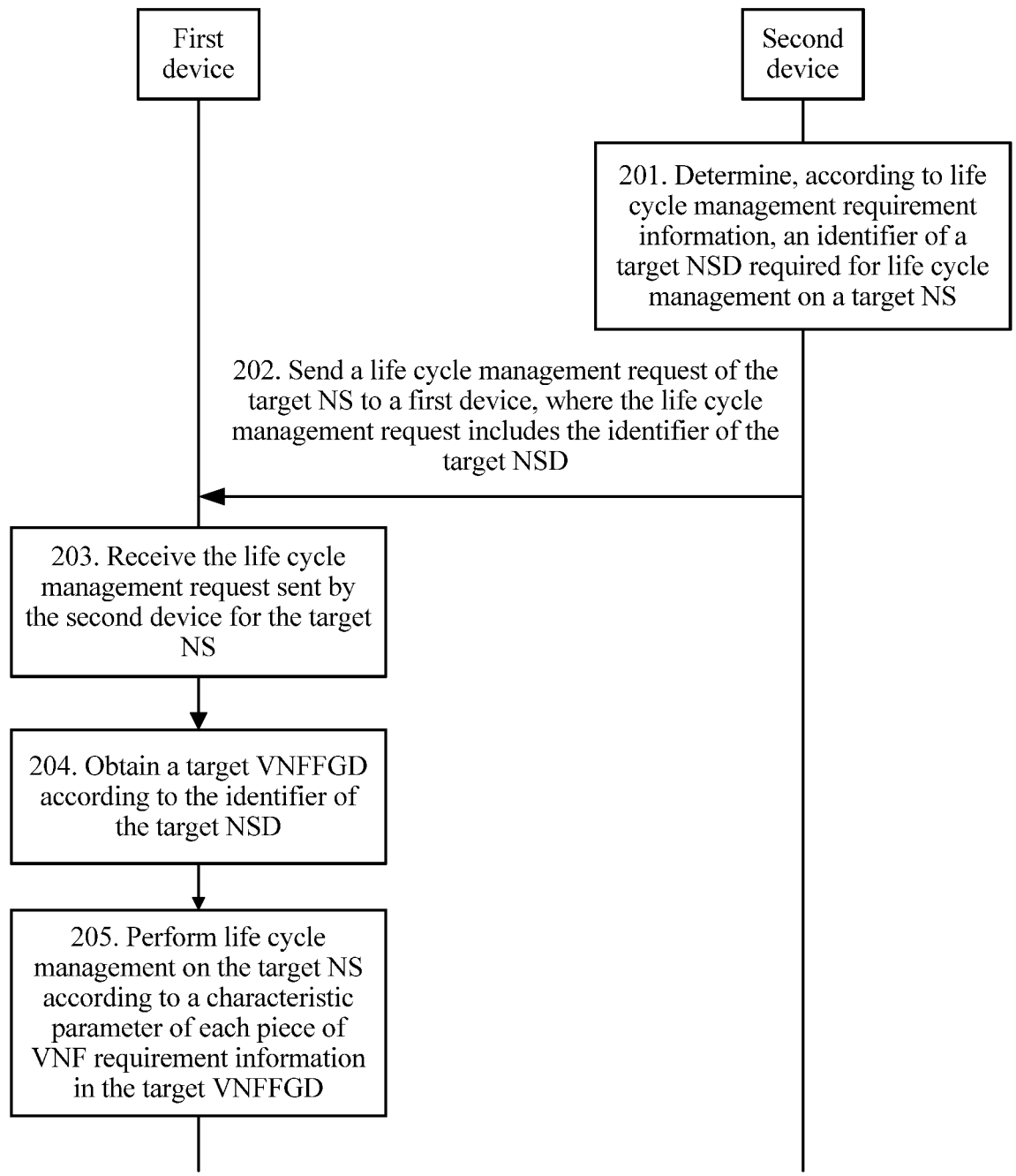
FIG. 5 is a schematic flowchart of a life cycle management method for a network service according to Embodiment 2 of the present disclosure.

FIG. 5 is a schematic flowchart of a life cycle management method for a network service according to Embodiment 2 of the present disclosure. As shown in FIG. 5, the method provided in Embodiment 2 of the present disclosure may include the following step 201 to step 205.

201. A second device determines, according to life cycle management requirement information, an identifier of a target NSD required for life cycle management on a target NS.

The second device is a device initiating a life cycle management request. In this embodiment of the present disclosure, the life cycle management request is used to establish a network connection between multiple VNF instances obtained by means of instantiation. The second device determines, according to the life cycle management requirement information, the identifier of the target NSD required for life cycle management on the target NS. The life cycle management requirement information is used to determine an NS to which the current to-be-connected multiple VNF instances belong, that is, the target NS. In addition, the life cycle requirement information is further used to determine the target NSD of the target NS, that is, a network service descriptor of the target NS.

202. The second device sends a life cycle management request of the target NS to a first device, where the life cycle management request includes the identifier of the target NSD.

After the second device determines the identifier of the target NSD, the second device sends the life cycle management request of the target NS to the first device, and the life cycle management request is used to instruct the first device to perform life cycle management on the target NS. The life cycle management request includes the identifier of the target NSD, and the target NSD includes a target VNFFGD. The target VNFFGD includes a characteristic parameter of each piece of virtualized network function VNF instance requirement information in multiple pieces of VNF instance requirement information required by the target NSD. Because both the second device end and the first device end store multiple NSDs, there are VNF forwarding graph descriptors corresponding to the multiple NSDs on both the second device end and the first device end.

203. The first device receives the life cycle management request sent by the second device for the target NS.

The first device is a device on which the MANO in FIG. 1 runs. The first device includes a virtualized infrastructure manager VIM, a virtualized network function manager VNFM, and a network functions virtualization orchestrator NFVO. The NFVO receives the life cycle management request sent by the second device for the target NS, and searches for the target NSD according to the identifier of the target NSD. The NFVO stores multiple NSDs and instantiation information of multiple instantiated VNF instances.

204. The first device obtains a target VNFFGD according to the identifier of the target NSD.

The NFVO in the first device searches for the target NSD according to the identifier of the target NSD, and obtains the target VNFFGD of the found target NSD. The target VNFFGD includes the characteristic parameter of each piece of virtualized network function VNF instance requirement information in the multiple pieces of VNF instance requirement information required by the target NSD. Optionally, the NFVO obtains, from the second device, the characteristic parameter of each piece of VNF instance requirement information in the multiple pieces of VNF instance requirement information required by the target NSD. Before sending the life cycle management request, the second device marks, according to the identifier of the target NSD, the characteristic parameter of each piece of VNF instance requirement information in the multiple pieces of VNF instance requirement information required by the target NSD. Optionally, the NFVO marks the characteristic parameter of each piece of VNF instance requirement information in the multiple pieces of VNF instance requirement information required by the target NSD.

Optionally, the characteristic parameter is used to identify VNF instance requirement information that is in the target NSD and that includes a virtualized network function descriptor VNFD and a deployment flavor.

Optionally, the characteristic parameter is used to identify VNF instance requirement information that is in the target NSD and that includes a virtualized network function descriptor, a deployment flavor, and an instance parameter. The instance parameter is used to identify different pieces of VNF instance requirement information that have a same virtualized network function descriptor and a same deployment flavor.

205. The first device performs life cycle management on the target NS according to characteristic parameter of each piece of VNF requirement information in the target VNFFGD.

The NFVO in the first device performs life cycle management on the target NS according to the characteristic parameter of each piece of VNF requirement information in the target VNFFGD, that is, establishes, according to the characteristic parameter of each piece of VNF requirement information in the target VNFFGD, a network connection between multiple VNF instances obtained by instantiating the target NS. The first device performs instantiation according to the multiple pieces of VNF instance requirement information required by the target NSD to obtain the multiple VNF instances, and the NFVO then establishes a network connection between the multiple VNF instances according to the characteristic parameter of each piece of VNF requirement information in the target VNFFGD.

Referring to FIG. 6, FIG. 6 shows a base element of a VNFFGD according to this embodiment of the present disclosure. A bold part in the fifth row in FIG. 6 includes a characteristic parameter "constituent VNF ID", and the characteristic parameter is used to instruct an NFVO to establish a network connection between VNF instances or between a VNF instance and a physical network function (PNF) instance according to the characteristic parameter. In the prior art, the bold part in the fifth row in FIG. 6 is nsd/vnfd/pnfd:connection_point:id. When multiple VNFs are generated based on one VNFD, it is hard to designate a connection point for connecting a particular VNF instance.

In this embodiment of the present disclosure, a second device determines, according to life cycle management requirement information, an identifier of a target NSD required for life cycle management on a target NS, and sends a life cycle management request of the target NS to a first device. The life cycle management request includes the identifier of the target NSD, and the target NSD includes a target VNFFGD. The target VNFFGD includes a characteristic parameter of each piece of virtualized network function VNF instance requirement information in multiple pieces of VNF instance requirement information required by the target NSD. The first device receives the life cycle management request sent by the second device for the target NS, obtains the target VNFFGD according to the identifier of the target NSD, and performs life cycle management on the target NS according to the characteristic parameter of each piece of VNF requirement information in the target VNFFGD, so as to clearly indicate a network connection between VNF instances.

Figure 7:
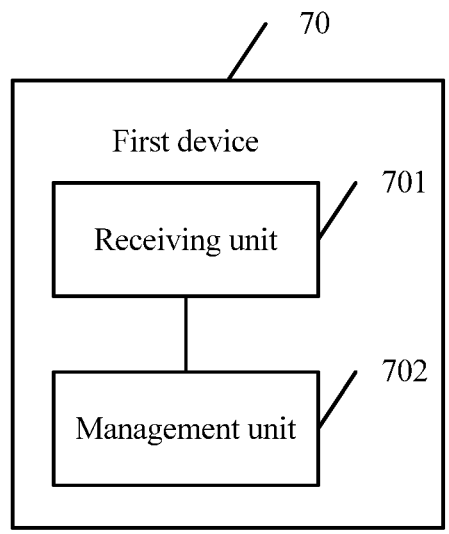
FIG. 7 is a schematic structural diagram of a first device according to an embodiment of the present disclosure.

Referring to FIG. 7, FIG. 7 is a schematic structural diagram of a first device according to an embodiment of the present disclosure. The first device provided in the embodiment corresponding to FIG. 7 is the device that is provided in Embodiment 1 and that is configured to receive a life cycle management request. The first device 70 includes a receiving unit 701 and a management unit 702.

The receiving unit 701 is configured to receive a life cycle management request sent by a second device for a target NS. The life cycle management request includes a mapping relationship between an identifier of an existing VNF instance and a characteristic parameter corresponding to the identifier. The characteristic parameter is an identifier parameter that is in a target NSD and that marks each piece of VNF instance requirement information in multiple pieces of VNF instance requirement information required by the target NSD.

The management unit 702 is configured to perform life cycle management on the target NS according to the existing VNF instance and the mapping relationship.

The management unit 702 includes a match unit, an obtaining unit, and an instantiation unit, which are not shown in FIG. 7.

The match unit is configured to match the mapping relationship with the characteristic parameter of each piece of VNF instance requirement information in the multiple pieces of VNF instance requirement information required by the target NSD.

The obtaining unit is configured to obtain an existing VNF instance corresponding to a matched characteristic parameter.

The instantiation unit is configured to perform instantiation according to VNF instance requirement information corresponding to a mismatched characteristic parameter.

Figure 8:
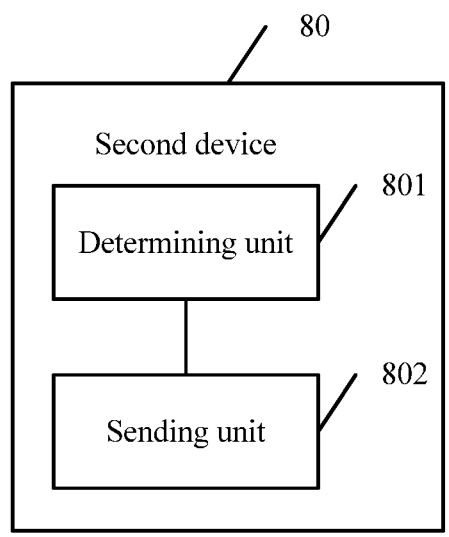
FIG. 8 is a schematic structural diagram of a second device according to an embodiment of the present disclosure.

Referring to FIG. 8, FIG. 8 is a schematic structural diagram of a second device according to an embodiment of the present disclosure. The second device provided in the embodiment corresponding to FIG. 8 is the device that is provided in Embodiment 1 and that is configured to initiate a life cycle management request. The second device 80 includes a determining unit 801 and a sending unit 802.

The determining unit 801 is configured to determine, according to life cycle management requirement information, an existing VNF instance required for life cycle management on a target NS.

The sending unit 802 is configured to send a life cycle management request of the target NS to a first device. The life cycle management request is used to instruct the first device to perform life cycle management on the target NS. The life cycle management request includes a mapping relationship between an identifier of the existing VNF instance and a characteristic parameter corresponding to the identifier. The characteristic parameter is an identifier parameter that is in a target NSD and that marks each piece of VNF instance requirement information in multiple pieces of VNF instance requirement information required by the target NSD.

The determining unit 801 is configured to determine, according to the life cycle management requirement information, the target NSD and the existing VNF instance required for life cycle management on the target NS, where the target NSD is a descriptor of the target NS; and determine, according to instantiation information of the existing VNF instance and the multiple pieces of VNF instance requirement information required by the target NSD, the identifier of the existing VNF instance and the characteristic parameter corresponding to the identifier.

The first device shown in FIG. 7 and the second device shown in FIG. 8 are configured to implement the life cycle management method for a network service according to Embodiment 1 of the present disclosure. Based on a same concept, the device embodiment and the method embodiment have a same technical effect. For a specific implementation process, refer to specific descriptions in Embodiment 1. Details are not described herein again.

Figure 9:
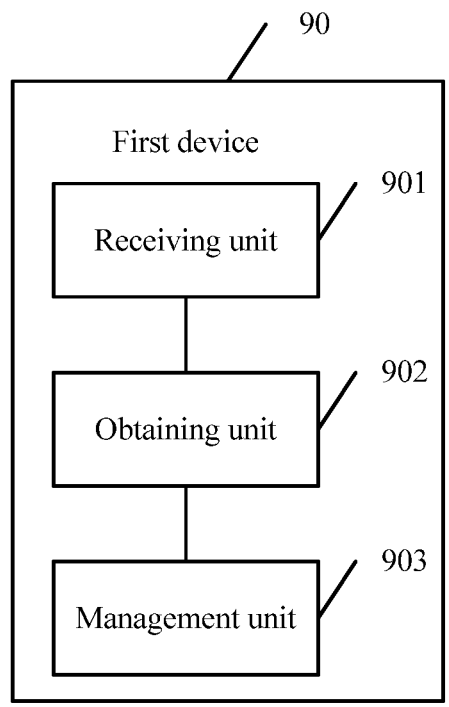
FIG. 9 is a schematic structural diagram of another first device according to an embodiment of the present disclosure.

Referring to FIG. 9, FIG. 9 is a schematic structural diagram of another first device according to an embodiment of the present disclosure. The first device provided in the embodiment corresponding to FIG. 9 is the device that is provided in Embodiment 2 and that is configured to receive a life cycle management request. The second device 90 includes a receiving unit 901, an obtaining unit 902, and a management unit 903.

The receiving unit 901 is configured to receive a life cycle management request sent by a second device for a target NS. The life cycle management request includes an identifier of a target NSD. The target NSD includes a target VNFFGD. The target VNFFGD includes a characteristic parameter of each piece of virtualized network function VNF instance requirement information in multiple pieces of VNF instance requirement information required by the target NSD.

The obtaining unit 902 is configured to obtain the target VNFFGD according to the identifier of the target NSD.

The management unit 903 is configured to perform life cycle management on the NS according to the characteristic parameter of each piece of VNF requirement information in the target VNFFGD.

The management unit 903 includes an instantiation unit and a connection unit, which are not shown in FIG. 9.

The instantiation unit is configured to perform instantiation according to the multiple pieces of VNF instance requirement information required by the target NSD to obtain multiple VNF instances.

The connection unit is configured to establish a network connection between the multiple VNF instances according to the characteristic parameter of each piece of VNF requirement information in the target VNFFGD.

Figure 10:
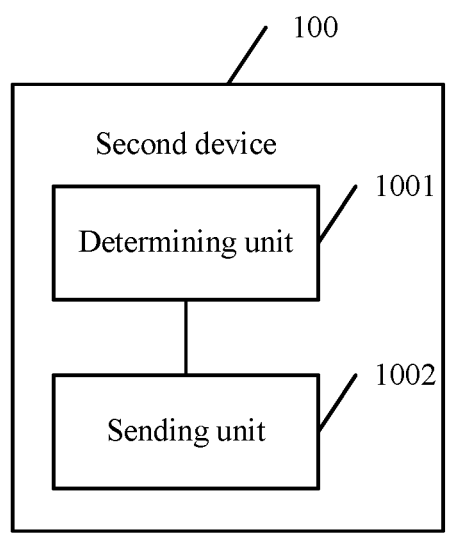
FIG. 10 is a schematic structural diagram of another second device according to an embodiment of the present disclosure.

Referring to FIG. 10, FIG. 10 is a schematic structural diagram of another second device according to an embodiment of the present disclosure. The second device provided in the embodiment corresponding to FIG. 10 is the device that is provided in Embodiment 2 and that is configured to initiate a life cycle management request. The second device 100 includes a determining unit 1001 and a sending unit 1002.

The determining unit 1001 is configured to determine, according to life cycle management requirement information, an identifier of a target NSD required for life cycle management on a target NS.

The sending unit 1002 is configured to send a life cycle management request of the target NS to a first device. The life cycle management request is used to instruct the first device to perform life cycle management on the target NS. The life cycle management request includes the identifier of the target NSD. The target NSD includes a target VNFFGD. The target VNFFGD includes a characteristic parameter of each piece of VNF instance requirement information in multiple pieces of VNF instance requirement information required by the target NSD.

The first device shown in FIG. 9 and the second device shown in FIG. 10 are configured to implement the life cycle management method for a network service according to Embodiment 2 of the present disclosure. Based on a same concept, the device embodiment and the method embodiment have a same technical effect. For a specific implementation process, refer to specific descriptions in Embodiment 2. Details are not described herein again.

Figure 11:
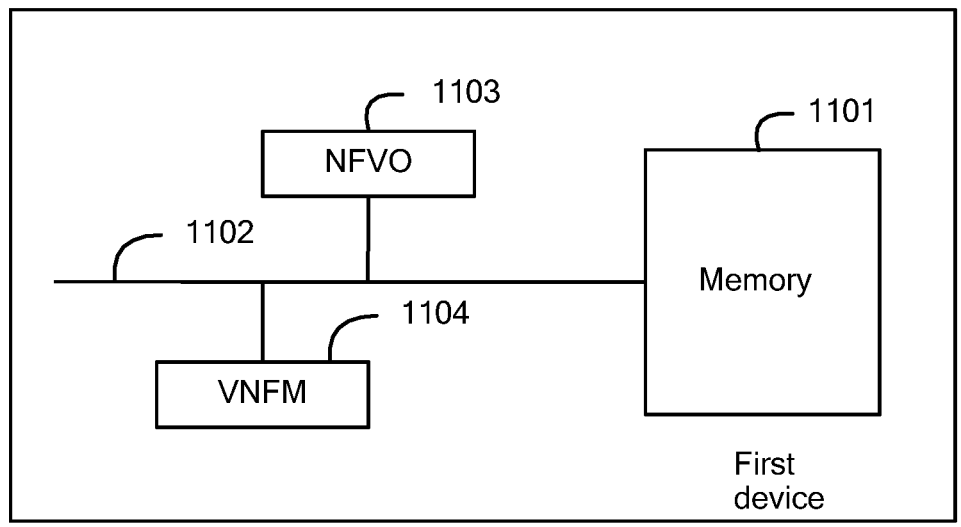
FIG. 11 is a schematic structural diagram of still another first device according to an embodiment of the present disclosure.

Referring to FIG. 11, FIG. 11 is a schematic structural diagram of still another first device according to an embodiment of the present disclosure. As shown in FIG. 11, the first device includes a memory 1101, a communications bus 1102, a NFVO 1103, and a VNFM 1104. The communications bus 1102 is configured to implement connection and communication between these components. The memory 1101 may be a high-speed random access memory (RAM) memory, or may be a non-volatile memory, for example, at least one magnetic disk memory. The memory 1101 stores a group of program codes, and the NFVO 1103 or the VNFM 1104 can execute a computer instruction by invoking the program code stored in the memory 1101, so as to implement the embodiment shown in FIG. 2 or FIG. 3.

The NFVO 1103 is configured to receive a life cycle management request sent by a second device, search for a target NSD according to the life cycle management request, analyze multiple pieces of VNF instance requirement information required by the target NSD, and then send an instantiation request to the VNFM 1104 according to an existing VNF instance and a mapping relationship in the life cycle management request.

The VNFM 1104 is configured to receive the instantiation request sent by the NFVO 1103, and generate a required VNF instance according to the instantiation request. After the VNFM 1104 finishes generating all VNF instances required by the target NS, the VNFM 1104 stores instantiation information of the generated VNF instances in the memory 1101, or puts the generated VNF instances into a network architecture including the first device and the second device.

The NFVO 1103 is further configured to establish a network connection between the VNF instances generated by the VNFM 1104, and the network connection includes a connection between the VNF instances and a connection between a VNF instance and a PNF.

The first device can improve processing efficiency of life cycle management and utilization of the VNF instance.

Figure 12:
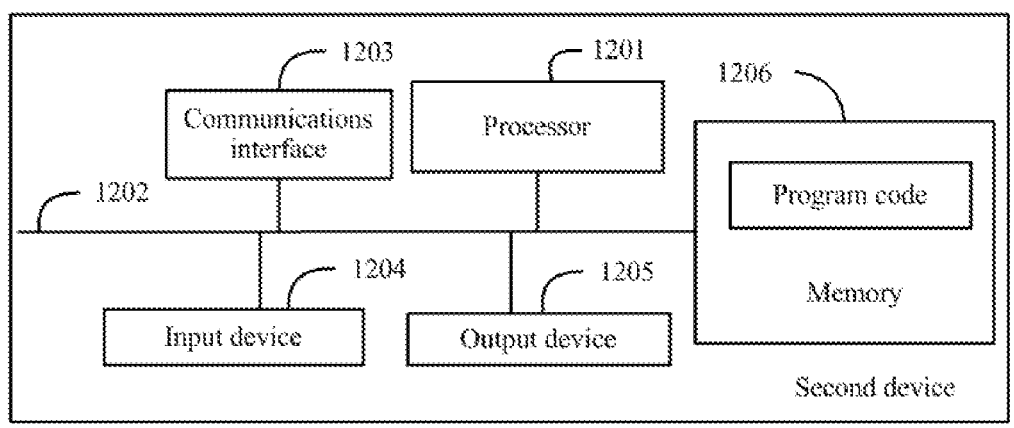
FIG. 12 is a schematic structural diagram of still another second device according to an embodiment of the present disclosure.

Referring to FIG. 12, FIG. 12 is a schematic structural diagram of still another second device according to an embodiment of the present disclosure. As shown in FIG. 12, the second device includes at least one processor 1201, for example, a central processing unit (CPU), at least one communications bus 1202, a communications interface 1203, an input device 1204, an output device 1205, and a memory 1206. The communications bus 1202 is configured to implement connection and communication between these components. The communications interface 1203 is configured to communicate with another device. The memory 1206 may be a high-speed RAM memory, or may be a non-volatile memory, for example, at least one magnetic disk memory. The memory 1206 stores a group of program codes, and the processor 1201 can execute a computer instruction by invoking the program code stored in the memory 1101, so as to implement the embodiment shown in FIG. 2 or FIG. 3.

The memory 1206 may store instantiation information of some instantiated VNFs. The processor 1201 controls a time when the output device 1205 outputs a life cycle management request and an NS to which a life cycle management request that is output by the output device 1205 belongs. The processor 1201 determines an existing VNF instance required for life cycle management on a target NS; obtains an identifier parameter that marks each piece of VNF instance requirement information in multiple pieces of VNF instance requirement information required by a target NSD; determines, according to instantiation information of the existing VNF instance and the multiple pieces of VNF instance requirement information required by the target NSD, an identifier of the existing VNF instance and a characteristic parameter corresponding to the identifier; and determines, according to the life cycle management requirement information, an identifier of the target NSD required for life cycle management on the target NS.

The output device 1205 sends the life cycle management request to a first device. The life cycle management request is used to instruct the first device to perform life cycle management on the target NS. The life cycle management request includes a mapping relationship between the identifier of the existing VNF instance and the characteristic parameter corresponding to the identifier. The life cycle management request further includes the identifier of the target NSD.

For ease of identification by the second device and the first device, the second device marks characteristic parameters for the multiple pieces of VNF instance requirement information required by the NSD.

An embodiment of the present disclosure further provides a life cycle management system for a network service. The life cycle management system includes the first device shown in FIG. 11 and the second device shown in FIG. 12. That is, the life cycle management system includes the first device shown in FIG. 7 and the second device shown in FIG. 8, and/or the first device shown in FIG. 9 and the second device shown in FIG. 10.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

A sequence of the steps of the method in the embodiments of the present disclosure may be adjusted, and certain steps may also be merged or removed according to an actual requirement.

Merging, division, and removing may be performed on the units in the embodiments of the present disclosure according to an actual need. A technical person in this field can perform a combination or an association of different embodiments described in this specification and characteristics of the different embodiments.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM, a read-only memory (ROM), an electrically erasable programmable read-only memory (EE-PROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from principle of the present disclosure shall fall within the protection scope of the present disclosure.

What is claimed is:

1. A life cycle management method for a network service, wherein the method comprises:
   receiving, by a network function virtualization orchestrator (NFVO) from an operation support system (OSS), a life cycle management request for a target network service (NS), wherein the life cycle management request comprises a mapping relationship between an identifier of an existing virtualized network function (VNF) instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, and wherein the VNF instance requirement information comprises a virtualized network function descriptor and a deployment flavor; and
   performing, by the NFVO, life cycle management on the target NS according to the existing VNF instance and the mapping relationship.

2. The method of claim 1, wherein the life cycle management request further comprises an identifier of the target NSD.

3. The method of claim 1, wherein the identifier of the existing VNF instance and the characteristic parameter corresponding to the identifier are determined by the OSS according to instance information of the existing VNF instance and the piece of VNF instance requirement information required by the target NSD.

4. The method of claim 1, wherein performing, by the NFVO, the life cycle management on the target NS according to the existing VNF instance and the mapping relationship comprises:
   matching, by the NFVO, the mapping relationship with the characteristic parameter of the piece of VNF instance requirement information required by the target NSD;
   obtaining, by the NFVO, an existing VNF instance corresponding to a matched characteristic parameter; and
   performing, by the NFVO, instantiation according to VNF instance requirement information corresponding to a mismatched characteristic parameter.

5. A life cycle management method for a network service, wherein the method comprises:
   determining, by an operation support system (OSS) according to life cycle management requirement information, an existing virtualized network function (VNF) instance required for life cycle management on a target network service (NS); and
   sending, by the OSS, a life cycle management request of the target NS to a network function virtualization orchestrator (NFVO), wherein the life cycle management request instructs the NFVO to perform life cycle management on the target NS, wherein the life cycle management request comprises a mapping relationship between an identifier of the existing VNF instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, wherein the VNF instance requirement information comprises a virtualized network function descriptor and a deployment flavor.

6. The method of claim 5; wherein the life cycle management request further comprises an identifier of the target NSD.

7. An apparatus, comprising:
   a processor; and
   a memory coupled to the processor and comprising instructions that, when executed by the processor, cause the apparatus to be configured to:
      receive, from an operation support system (OSS), a life cycle management request for a target network service (NS), wherein the life cycle management request comprises a mapping relationship between an identifier of an existing virtualized network function (VNF) instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, and wherein the VNF instance requirement information comprises a virtualized network function descriptor and a deployment flavor; and
      perform life cycle management on the target NS according to the existing VNF instance and the mapping relationship.

8. The apparatus of claim 7, wherein the life cycle management request further comprises an identifier of the target NSD.

9. An apparatus, comprising:
   a processor; and
   a memory coupled to the processor and comprising instructions that, when executed by the processor, cause the apparatus to be configured to:
      determine, according to life cycle management requirement information, an existing virtualized network function (VNF) instance required for life cycle management on a target network service (NS); and
      send a life cycle management request of the target NS to a network function virtualization orchestrator (NFVO), wherein the life cycle management request instructs the NFVO to perform life cycle management on the target NS, wherein the life cycle management request comprises a mapping relationship between an identifier of the existing VNF instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, and wherein the VNF instance requirement information comprises a virtualized network function descriptor and a deployment flavor.

10. The apparatus of claim 9, wherein the life cycle management request further comprises an identifier of the target NSD.

11. A method, comprising:
sending, by an operation support system (OSS), a life cycle management request for a target network service (NS) to a network function virtualization orchestrator (NFVO), wherein the life cycle management request instructs the NFVO to perform life cycle management on the target NS, wherein the life cycle management request comprises a mapping relationship between an identifier of an existing virtualized network function (VNF) instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, and wherein the VNF instance requirement information comprises a virtualized network function descriptor and a deployment flavor;
receiving, by the NFVO, the life cycle management request from the OSS; and
performing, by the NFVO, the life cycle management on the target NS according to the existing VNF instance and the mapping relationship.

12. The method of claim 11, wherein the life cycle management request further comprises an identifier of the target NSD.

13. A communication system, comprising:
a network function virtualization orchestrator (NFVO) comprising:
a processor; and
a memory coupled to the processor and storing instructions; and
an operation support system (OSS) communicatively coupled to the NFVO and configured to send a life cycle management request for a target network service (NS) to the NFVO,
wherein the instructions, when executed by the processor, cause the NFVO to be configured to:
receive the life cycle management request from the OSS, wherein the life cycle management request comprises a mapping relationship between an identifier of an existing virtualized network function (VNF) instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, and wherein the VNF instance requirement information comprises a virtualized network function descriptor and a deployment flavor; and
perform life cycle management on the target NS according to the existing VNF instance and the mapping relationship.

14. The communication system of claim 13, wherein the life cycle management request further comprises an identifier of the target NSD.

15. A non-transitory computer readable storage medium storing a program that, when executed by a processor, causes the processor to be configured to:
receive, from an operation support system (OSS), a life cycle management request for a target network service (NS), wherein the life cycle management request comprises a mapping relationship between an identifier of an existing virtualized network function (VNF) instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, and wherein the VNF instance requirement information comprises a virtualized network function descriptor and a deployment flavor; and
perform life cycle management on the target NS according to the existing VNF instance and the mapping relationship.

16. A non-transitory computer readable storage medium storing a program that, when executed by a processor, causes the processor to be configured to:
determine, according to life cycle management requirement information, an existing virtualized network function (VNF) instance required for life cycle management on a target network service (NS); and
send a life cycle management request of the target NS to a network function virtualization orchestrator (NFVO), wherein the life cycle management request instructs the NFVO to perform life cycle management on the target NS, wherein the life cycle management request comprises a mapping relationship between an identifier of the existing VNF instance and a characteristic parameter corresponding to the identifier, wherein the characteristic parameter is an identifier parameter that is in a target network service descriptor (NSD), wherein the characteristic parameter is for identifying only one piece of VNF instance requirement information that is in the target NSD, and wherein the VNF instance requirement information comprises a virtualized network function descriptor and a deployment flavor.

* * * * *